US011449311B2

(12) United States Patent
Wassenberg et al.

(10) Patent No.: US 11,449,311 B2
(45) Date of Patent: Sep. 20, 2022

(54) RANDOM NUMBER GENERATOR

(71) Applicant: Google LLC, Mountain View, CA (US)

(72) Inventors: Jan Wassenberg, Langnau am Albis (CH); Robert Obryk, Zurich (CH); Jyrki Alakuijala, Wollerau (CH); Emmanuel Mogenet, Bach (CH)

(73) Assignee: Google LLC, Mountain View, CA (US)

( * ) Notice: Subject to any disclaimer, the term of this patent is extended or adjusted under 35 U.S.C. 154(b) by 316 days.

(21) Appl. No.: 16/613,516

(22) PCT Filed: Nov. 7, 2017

(86) PCT No.: PCT/US2017/060275
§ 371 (c)(1),
(2) Date: Nov. 14, 2019

(87) PCT Pub. No.: WO2019/093992
PCT Pub. Date: May 16, 2019

(65) Prior Publication Data
US 2020/0401375 A1    Dec. 24, 2020

(51) Int. Cl.
*G06F 21/00* (2013.01)
*H04L 29/06* (2006.01)
(Continued)

(52) U.S. Cl.
CPC ............ *G06F 7/582* (2013.01); *H04L 9/0625* (2013.01); *H04L 9/0631* (2013.01); *H04L 9/0869* (2013.01)

(58) Field of Classification Search
CPC ..... G06F 7/582; H04L 9/0625; H04L 9/0631; H04L 9/0869
See application file for complete search history.

(56) References Cited

U.S. PATENT DOCUMENTS

2009/0310778 A1* 12/2009 Mueller ............... H04L 9/0625
                                                          380/28
2011/0096923 A1*  4/2011 Rollgen ............... H04L 9/0662
                                                          380/28
(Continued)

OTHER PUBLICATIONS

John K Salmon et al: "Parallel random numbers: As easy as 1, 2, 3", High Performance Computing, Networking, Storage and Analysis (SC), 2011 International Conference For, IEEE, Nov. 12, 2011 (Nov. 12, 2011), pp. 1-12, XP032081465, DOI: 10.1145/2063384. 2063405 ISBN: 978-1-4503-0771-0, section 1, 3, 4.1.

(Continued)

*Primary Examiner* — Lisa C Lewis
(74) *Attorney, Agent, or Firm* — Honigman LLP; Brett A. Krueger

(57) ABSTRACT

A method for generating random numbers includes initializing a pseudo-random number generator (PRNG) having a state of 2048 bits comprising inner bits and outer bits, the inner bits comprising the first 128 bits of the 2048 bits and the outer bits comprising the remaining bits of the 2048 bits. The method also includes retrieving AES round keys from a key source, and for a threshold number of times, executing a round function using the AES round keys by XOR'ing odd-numbered branches of a Feistel network having 16 branches of 128 bits with a function of corresponding even-numbered neighbor branches of the Feistel network, and shuffling each branch of 128 bits into a prescribed order. The method also includes executing an XOR of the inner bits of the permuted state with the inner bits of a previous state.

20 Claims, 6 Drawing Sheets

(51) Int. Cl.
*G06F 7/58* (2006.01)
*H04L 9/06* (2006.01)
*H04L 9/08* (2006.01)

(56) References Cited

U.S. PATENT DOCUMENTS

2013/0168450 A1\* 7/2013 von Mueller ......... H04L 9/0618
  235/449
2017/0288855 A1\* 10/2017 Kumar .................. H04L 9/0631

OTHER PUBLICATIONS

Christophe Petit et al: "A block cipher based pseudo random number generator secure against side-channel key recovery", Proceedings of the 2008 ACM Symposium on Information, Computer and Communications Security, ASIACCS '08, ACM Press, New York, New York, USA, Mar. 18, 2008 (Mar. 18, 2008), pp. 56-65, XP058092540, DOI: 10.1145/1368310.1368322 ISBN: 978-1-59593-979-1 section 2, 4.2 (point a2).

International Search Report and Written Opinion for the related PCT Application PCT/US2017/060275 dated Jul. 23, 2018.

\* cited by examiner

RANDOM NUMBER GENERATOR

TECHNICAL FIELD

This disclosure relates to generating random numbers.

BACKGROUND

Randomized algorithms generally rely on pseudorandom number generator (PRNGs) when sorting, shuffling, and/or sampling from large data streams to keep data belonging to clients secure. A PRNG uses a deterministic algorithm to generate pseudo-random numbers at a very fast speed from a random input called a seed. An algorithm that relies on a PRNG may lose its performance guarantee when an adversary can predict the behavior of the PRNG. A strong PRNG, while providing attack-resistance from adversaries, generally suffers from slow workaround times. On the other hand, fast PRNGs are generally easily predictable, rendering the PRNGs vulnerable to unexpected correlations or exploitation by attackers/adversaries. Accordingly, developers are often left having to determine an appropriate security/speed tradeoff when choosing a PRNG for a randomized application. Often, developers are unaware that randomized applications can be vulnerable to adversaries, and are therefore reluctant to sacrifice speed for security. The task of auditing tens of thousands of random generator usages to identify the security/speed tradeoffs is as daunting as it is expensive.

SUMMARY

One aspect of the disclosure provides a method for generating pseudo-random numbers. The method includes initializing, by data processing hardware, a pseudo-random number generator (PRNG) having a state of 2048 bits including inner bits and outer bits. The inner bits include the first 128 bits of the 2048 bits and the outer bits include the remaining bits of the 2048 bits. The method also includes permuting, by the data processing hardware, the state of the PRNG by retrieving Advanced Encryption Standard (AES) round keys from a key source. The method further includes permuting the state of the PRNG for a threshold number of times by executing a round function using the AES round keys. The round function includes XOR'ing odd-numbered branches of a Feistel network having 16 branches of 128 bits with a function of corresponding even-numbered neighbor branches of the Feistel network. For the threshold number of times, the method also includes permuting the state of the PRNG by shuffling each branch of 128 bits into a prescribed order. The method also includes executing, by the data processing hardware, an XOR of the inner bits of the permuted state with the inner bits of a previous state.

Some or all of the state, and in particular some or all of the outer bits, may then be used as, or to provide, the pseudo-random number, for further use or manipulation as required.

The Feistel network may be a generalized Feistel network, or more particularly a generalized type-2 Feistel network.

Implementations of the disclosure may include one or more of the following optional features. In some implementations, initializing the PRNG includes setting the state of the PRNG to zero and setting the outer bits to arbitrary seed values. Optionally, initializing the PRNG may also include setting the state of the PRNG to a previous state. The threshold number of times may include at least 17 times. In some examples, the round function includes at least two rounds of AES. In these examples, each of the at least two rounds of AES may use a corresponding AES round key that is different than the AES round keys of the other rounds of AES.

In some examples, XOR'ing the odd-numbered branches of the Feistel network with the function of corresponding even-numbered neighbor branches of the Feistel network results in random bits. In these examples, the outer bits include the resulting random bits. The shuffling of each branch of 128 bits into the prescribed order may achieve full sub-branch diffusion after executing the round function and shuffling each branch eight times. In some implementations, the prescribed order includes {7, 2, 13, 4, 11, 8, 3, 6, 15, 0, 9, 10, 1, 14, 5, 12}. Optionally, the method may include preventing access to the inner bits and allowing access to the outer bits.

The disclosure also provides one or more computer readable media comprising computer program code arranged to carry out the described methods when implemented on suitable computer apparatus.

The disclosure also provides apparatus arranged to implement the described methods. For example, another aspect of the disclosure provides a system for generating random numbers. The system includes data processing hardware and memory hardware in communication with the data processing hardware. The memory hardware stores instructions that when executed on the data processing hardware cause the data processing hardware to perform operations. The operations include initializing a pseudo-random number generator (PRNG) having a state of 2048 bits, including inner bits and outer bits. The inner bits include the first 128 bits of the 2048 bits and the outer bits include the remaining bits of the 2048 bits. The operations also include permuting the state of the PRNG by retrieving Advanced Encryption Standard (AES) round keys from a key source. Permuting the state of the PRNG also includes, for a threshold number of times, executing a round function using the AES round keys. The round function includes XOR'ing odd-numbered branches of a Feistel network having 16 branches of 128 bits with a function of corresponding even-numbered neighbor branches of the Feistel network. Permuting the state of the PRNG further includes, for the threshold number of times, shuffling each branch of 128 bits into a prescribed order. The operations also include executing an XOR of the inner bits of the permuted state with the inner bits of a previous state.

Implementations of the disclosure may include one or more of the following optional features. In some configurations of the system, initializing the PRNG includes setting the state of the PRNG to zero and setting the outer bits to arbitrary seed values. The threshold number of times may include at least 17 times. In some examples, the round function includes at least two rounds of AES. In these examples, each of the at least two rounds of AES may use a corresponding AES round key that is different than the AES round keys of the other rounds of AES.

In some implementations, XOR'ing the odd-numbered branches of the Feistel network with the function of corresponding even-numbered neighbor branches of the Feistel network results in random bits. The shuffling of each branch of 128 bits into the prescribed order may achieve full sub-branch diffusion after executing the round function and shuffling each branch eight times. In some implementations, the prescribed order includes {7, 2, 13, 4, 11, 8, 3, 6, 15, 0, 9, 10, 1, 14, 5, 12}. Optionally, the method may include preventing access to the inner bits and allowing access to the outer bits.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
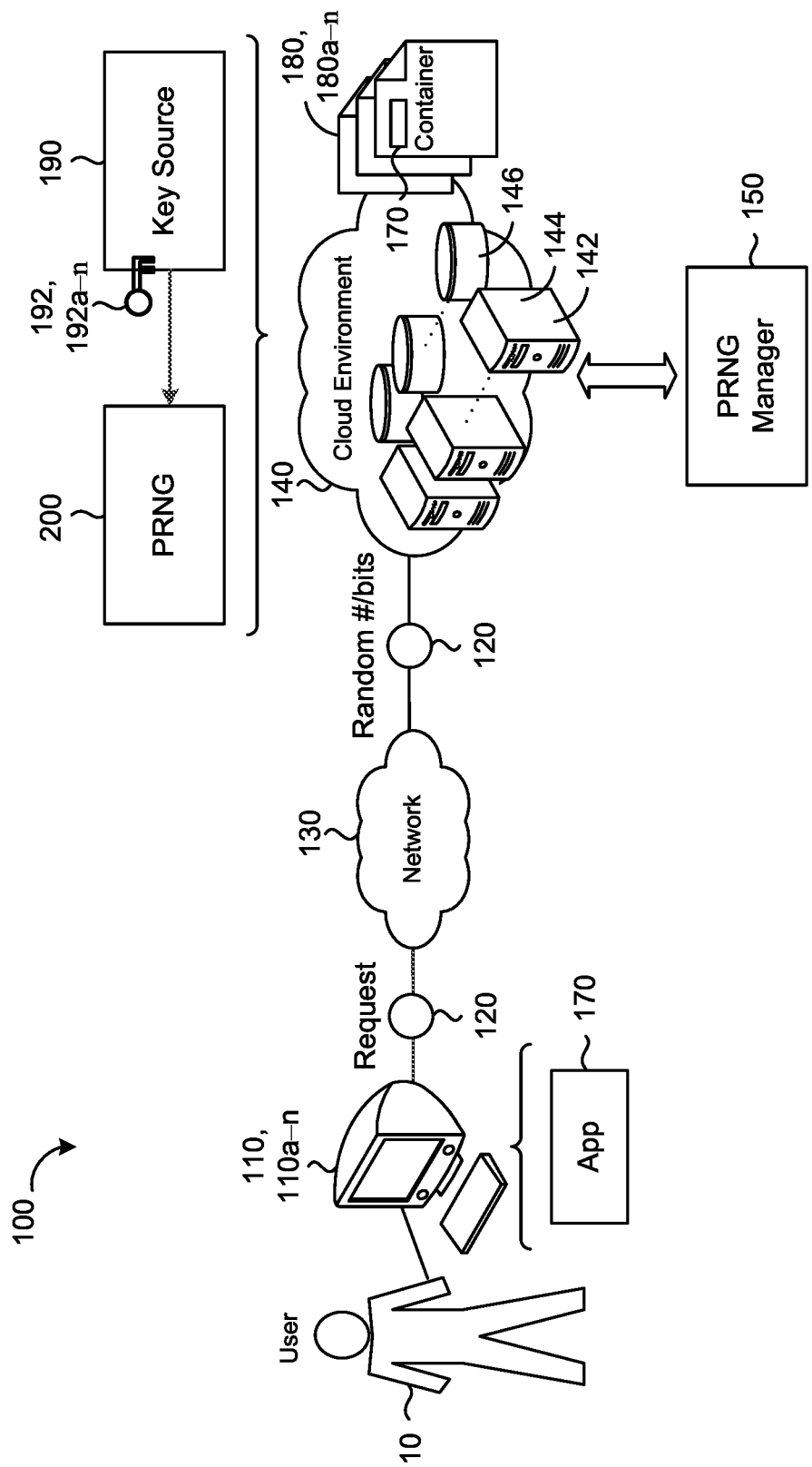
FIG. 1 is a schematic view of an example system for generating a random number.

Implementations herein are directed toward a pseudo-random number generator (PRNG) that achieves run-time costs on par with existing general-purpose random number generators, while providing a higher baseline level of security. For instance, the 'higher baseline level of security' refers to the PRNG characterized by properties of empirical randomness, unpredictability, and backtracking resistance. Existing general-purpose random number generators may exhibit one or two of these properties of empirical randomness, unpredictability, and backtracking resistance, but none are known that exhibit all three without severely sacrificing speed (e.g., increasing run-time costs).

As used herein, 'empirical randomness' refers to the PRNG exhibiting a reduced likelihood of flaws such as correlations that might affect simulations, and 'unpredictability' refers to the PRNG being capable of preventing relatively powerful adversaries that are able to generate and store $\geq 2^{64}$ random outputs from predicting future outputs unless they know a current state of the PRNG. Thus, adversaries only have a negligible probability of correctly predicting future outputs by the PRNG unless the adversaries gain access to the current state, or are able to issue at least $2^{64}$ queries. Since it may cost an adversary over 110,000 USD to issue an attack of at least $2^{64}$ queries, the $2^{64}$ lower bound is selected as a conservative estimate to deter potential attackers from attempting to predict the random outputs. The 'unpredictability' of the PRNG also makes the PRNG useful for non-cryptographic applications by making it harder for adversaries to trigger worst cases in randomized algorithms or influencing the samples drawn by randomized online sampling algorithms. Lastly, 'backtracking resistance' refers to the PRNG preventing reconstruction of past outputs even if the current state of the PRNG is compromised. While the property of 'backtracking resistance' may not be necessary for simulation applications, this property will prevent adversaries from discovering outputs of past behavior through which input samples were sniffed/sampled.

In some implementations, the PRNG employs a generalized type-2 Feistel network having 16 branches of 128 bits and permutes a state of the PRNG by executing a round function using Advanced Encryption Standard round keys and shuffling each branch of 128 bits into a prescribed order after executing the round function. The permuting may repeat the executing of the round function and subsequent shuffling for a threshold number of times in order for the shuffling to successfully achieve full-bit diffusion. As used herein, the term "threshold number of times" may refer to a threshold number permutation rounds with each permutation round executing a corresponding round function using the AES keys and the subsequent shuffling. In some examples, the threshold number of times includes at least 17 times for full-bit diffusion since the shuffling achieves two sub-block diffusions after 16 rounds. Moreover, executing the round function may include executing at least two rounds of AES in order to achieve full-bit diffusion. Generally, a single round of AES is less efficient than two AES rounds in terms of a ratio of active substitution-boxes.

Referring to FIG. 1, in some implementations, a system 100 includes one or more client devices 110, 110a-n associated with a user 10, who may communicate, via a network 130, with a remote system 140. The remote system 140 may be a distributed system (e.g., cloud environment) having scalable/elastic resources 142. The resources 142 include computing resources 144 (e.g., data processing hardware) and/or storage resources 146 (e.g., memory hardware). In some implementations, the remote system 140 executes a key source 190 containing Advanced Encryption Standard (AES) round keys 192 and a pseudo-random number generator (PRNG) 200 in communication with the key source 190 and configured to generate random bits 202 by executing a round function that uses AES round keys 192 retrieved from the key source 190. As used herein, the term random bits 202 and random number(s) may be used interchangeably. The round function may include two rounds of AES with each round of AES using a corresponding AES round key 192 that is different than the AES round key 192 of the other round of AES. The round function may also include more than two rounds of AES with each of the rounds of AES using a different corresponding AES round key 192. The AES round keys 192 may be dense and independent from one another to ensure that a corresponding round of AES breaks symmetry of plaintext with all-equal columns, thereby avoiding attacks from adversaries.

In some examples, the remote system 140 executes a PRNG manager 150 for managing access to the PRNG 200. The client devices 110 can be any computing devices that are capable of communicating with the PRNG manager 150 through the network 130. The client devices 110 include, but are not limited to, desktop computing devices and mobile computing devices, such as laptops, tablets, smart phones, and wearable computing devices (e.g., headsets and/or watches). The client devices 110 may correspond to users 10 of the remote system 140 that deploy and/or access software applications 170 executing on the remote system 140. For instance, the remote system 140 may execute a container environment having one or more containers 180, 180a-n within memory hardware the contents of one or more the containers 180 may be collectively associated with the software application 170 executing on the remote system 140. The client device 110 may additionally or alternatively execute software applications 170.

In some implementations, the PRNG 200 generates a random number 202 in response to receiving a random number request 120 from a client device 110, and the PRNG manager 150 transmits the random number 202 back to the client device 110. Additionally or alternatively, the software application 170 executing on the remote system 140 may provide the random number request 120 and receive the random number 202 generated by the PRNG 200 directly from the PRNG manager 150. This disclosure is not limited any one specific source providing the request 120. In fact, the PRNG 200 may be configured to generate random bits 202 independent of receiving a request 120. In some scenarios, the software application 170 uses the random number 202 as an input seed value. In other scenarios, the software application 164 corresponds to a gaming application, such as an electronic lottery, that uses the random number 202 output by the PRNG 200 as a lottery number (or sequence of lottery numbers). The PRNG 200 may generate random numbers/bits 202 for use by any task/algorithm that requires random numbers.

Referring to FIGS. 1 and 2A-2C, in some implementations, the PRNG 200 has a state of 2,048-bits 210 including inner bits 210$i$ and outer bits 210$o$. The inner bits 210$i$ include the first 128-bits and the outer bits 210$o$ include the remaining bits of the 2,048-bits. The inner bits 210$i$ correspond to an inaccessible 'inner' portion associated with a 'capacity' of a sponge. In cryptography, a sponge function or sponge construction is a class of algorithms with finite internal state that take an input bit stream of any length and produce an output bit stream of any desired length. The data processing hardware 142 initializes (i) the PRNG 200 and then implements a Feistel network to permute the state of the PRNG 200 for generating random numbers 202. Since the PRNG 200 is configured to generate reproducible sequences of random numbers 202, seeding the state from external entropy sources is not desirable. In some scenarios, initializing the PRNG 200 includes setting the state of the PRNG 200 to zero and optionally setting at least a portion of the outer bits 210$o$ to arbitrary user-specified seed values. In other scenarios, initializing the PRNG 200 includes setting the state of the PRNG 200 to a previous state. This scenario of initializing the PRNG 200 may be used after the PRNG 200 is first constructed through the initialization of setting the state to zero and setting the outer bits 210$o$ to the arbitrary user-specified seed values.

After initializing the PRNG 200, the data processing hardware 142 commences permutation by retrieving the AES round keys 192 from the key source 190. The Feistel network includes 16-branches 220 with each branch having 128-bits. The Feistel network includes a type-2 generalized Feistel network conventionally reserved for constructing large permutations from smaller blocks/branches (e.g., 16- to 32-bit blocks). Type-2 generalized Feistel network constructions are 'sound' in the sense that they produce strong pseudorandom permutations after a sufficient number of permutation rounds of a pseudorandom function. Yet, unlike some existing number generators that use Feistel networks with more than eight (8) branches/blocks, the Feistel network disclosed herein does not rely on multiple independent inputs. In the example shown in FIG. 2A, when the PRNG 200 is initialized (i), the first branch $S_0$ 220 includes the inner bits 210$i$ (e.g., 128-bits) and the second through sixteenth branches $S_1$-$S_{15}$ 220 include the outer bits 210$o$ (e.g., 128 outer bits in each branch $S_1$-$S_{15}$). The permutation includes two steps: (1) executing a round function; and (2) a shuffling each branch 220 of 128-bits into a prescribed order after executing the round function.

During the first step of the permutation, the data processing hardware 142 executes the round function using the AES round keys 192. The round function may include an AES block cipher hardware-accelerated on the data processing hardware 142 and may use AESNI instructions so that the round function is five to ten times faster than optimized software implementations, while outperforming the permutation by existing random number generators. The round function employed by the PRNG 200 uses an XOR 240 for XOR'ing odd-numbered branches 220 of the Feistel network with a function 230 of corresponding even-numbered neighbor branches 220 of the Feistel network. In the example shown, the round function XORs the odd-numbered branch $S_1$ 220 with the function 230 of the corresponding even-numbered neighbor branch $S_0$ 220 to output corresponding random outer bits 210$o_R$. Similarly, the round function XORs the odd-numbered branch $S_3$ 220 with the corresponding even-numbered neighbor branch $S_2$ 220 to output corresponding random outer bits 210$o_R$ and so on until the round function XORs the last odd-numbered branch $S_{15}$ 220 with the corresponding even-numbered neighbor branch $S_{14}$ 220 to output corresponding random outer bits 210$o_R$. Accordingly, the permutation executes eight (8) round functions in parallel since one round function includes two (2) neighboring even-odd branches 220. By contrast, traditional permutation techniques only execute one round function at a time, or at the most, execute four to six round functions in parallel. However, since recent advancements in hardware-accelerated processors, the PRNG 200 is capable of executing eight (8) round functions in parallel with each round function including at least two rounds of AES.

Providing the PRNG 200 with the state of 2,048-bits enables parallel evaluation of the round functions, thereby hiding long latency associated with AESENC instructions. By contrast, existing number generators limited by slower computing performance typically have states of 256-bits, thereby only requiring a Feistel network having 8-branches of 32-bits each for a total of four (4) round functions needed to permute the branches.

In some examples, the round function includes at least two rounds of AES with each round of AES using a corresponding AES round key 192 that is different than the AES round key 192 of the other round of AES. For instance, the round function including two rounds of AES may be expressed as follows.

```
const V* RoundFunction(const V* keys) {
    for (int branch = 0; branch < 16; branch += 2) {
        const V even = Load (state, branch);
        const V odd = Load (state, branch + 1);
        // Round junction: two-round AES with different keys.
        const V f1 = AES (even, *keys++);
        const V f2 = AES (f1, odd);
        Store (f2, state, branch + 1);
    }
    Return keys;
}
```

During the second step of the permutation, a shuffler 250 shuffles each branch 220 of 128-bits into the prescribed order. For instance, the shuffler receives the bits 210 from each of the even-numbered branches $S_0, S_2, \ldots, S_{14}$ 220 and the random outer bits 210$o_R$ generated by the round functions XOR'ing each odd-numbered branch 220 of the Feistel network with the function 230 of the corresponding even-numbered neighbor branch 220 of the Feistel network. In some examples, the prescribed order of the shuffler 250 is selected so that the Feistel network reaches full sub-branch diffusion after eight (8) permutation rounds, e.g., execution of the round function and subsequent shuffling is performed eight (8) times. Here, the term "full sub-branch diffusion" refers to each branch 220 of the Feistel network depending on every other input branch 220. By contrast, traditional shuffling techniques using cyclic shifts would require 16 permutation rounds on 16-branches to achieve full sub-branch diffusion, and thus, are slower. In one implementation, the prescribed order of the shuffler 250 includes {7, 2, 13, 4, 11, 8, 3, 6, 15, 0, 9, 10, 1, 14, 5, 12}, an order known to provide the best attack resistance for permuting 16-branches. For instance, the permutation step for shuffling the branches 220 into the prescribed order may be expressed as follows.

```
void BlockShuffle ( ) {
    uint64_t source [32];
    memcpy (source, state, sizeof(source));
    constexpr int shuffle [16] = {
        7, 2, 13, 14, 11, 8, 3, 6, 15, 0, 9, 10, 1, 14, 5, 12};
    for (int branch = 0; branch < 16; ++branch) {
        const V v = Load (source, shuffle [branch]);
        Store (v, state, branch);
    }
}
```

Figure 2A:
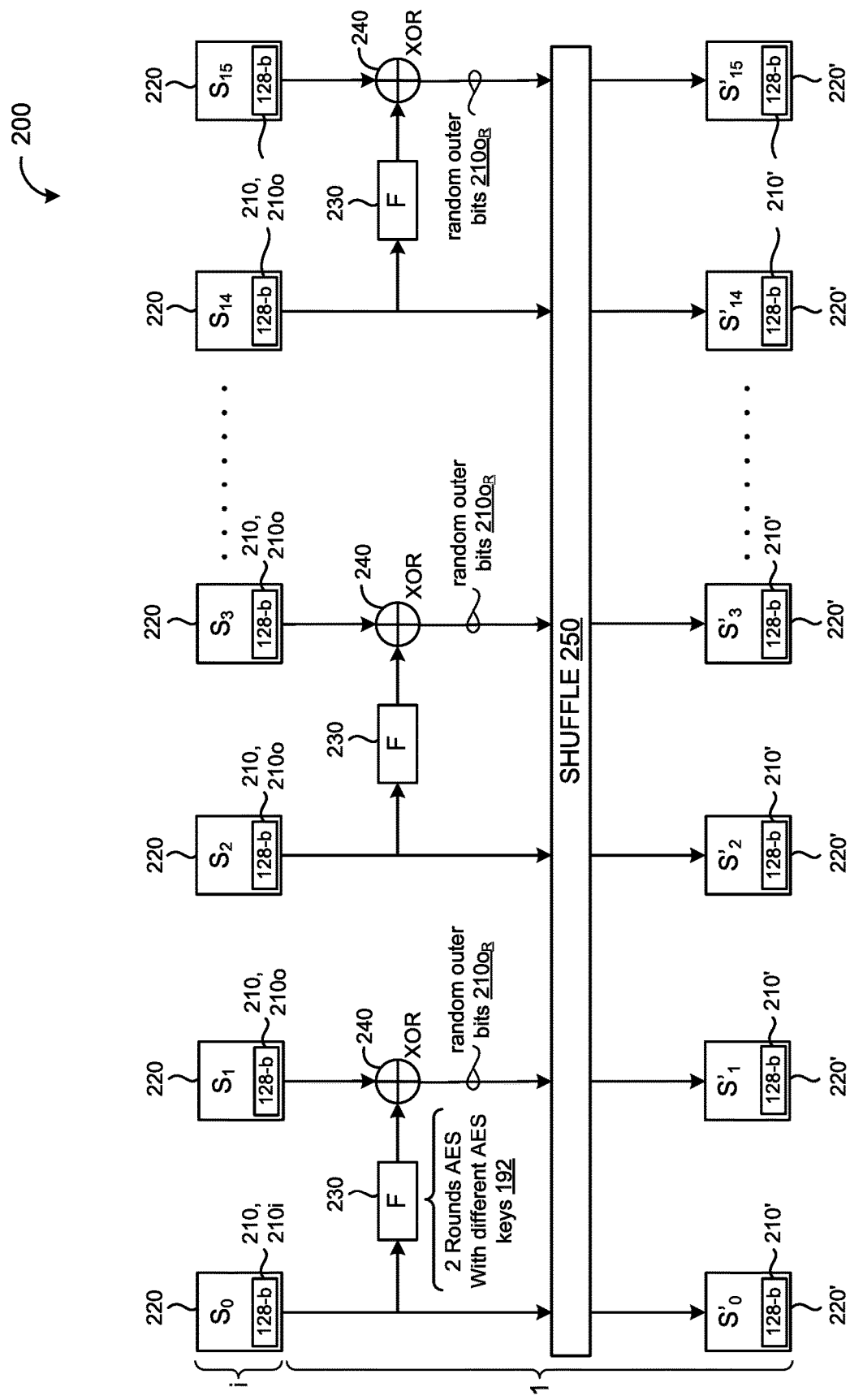
FIGS. 2A and 2B are schematic views of an example pseudo-random number generator (PRNG) implementing a generalized Feistel network having 16 branches of 128 bits.
Figure 2B:
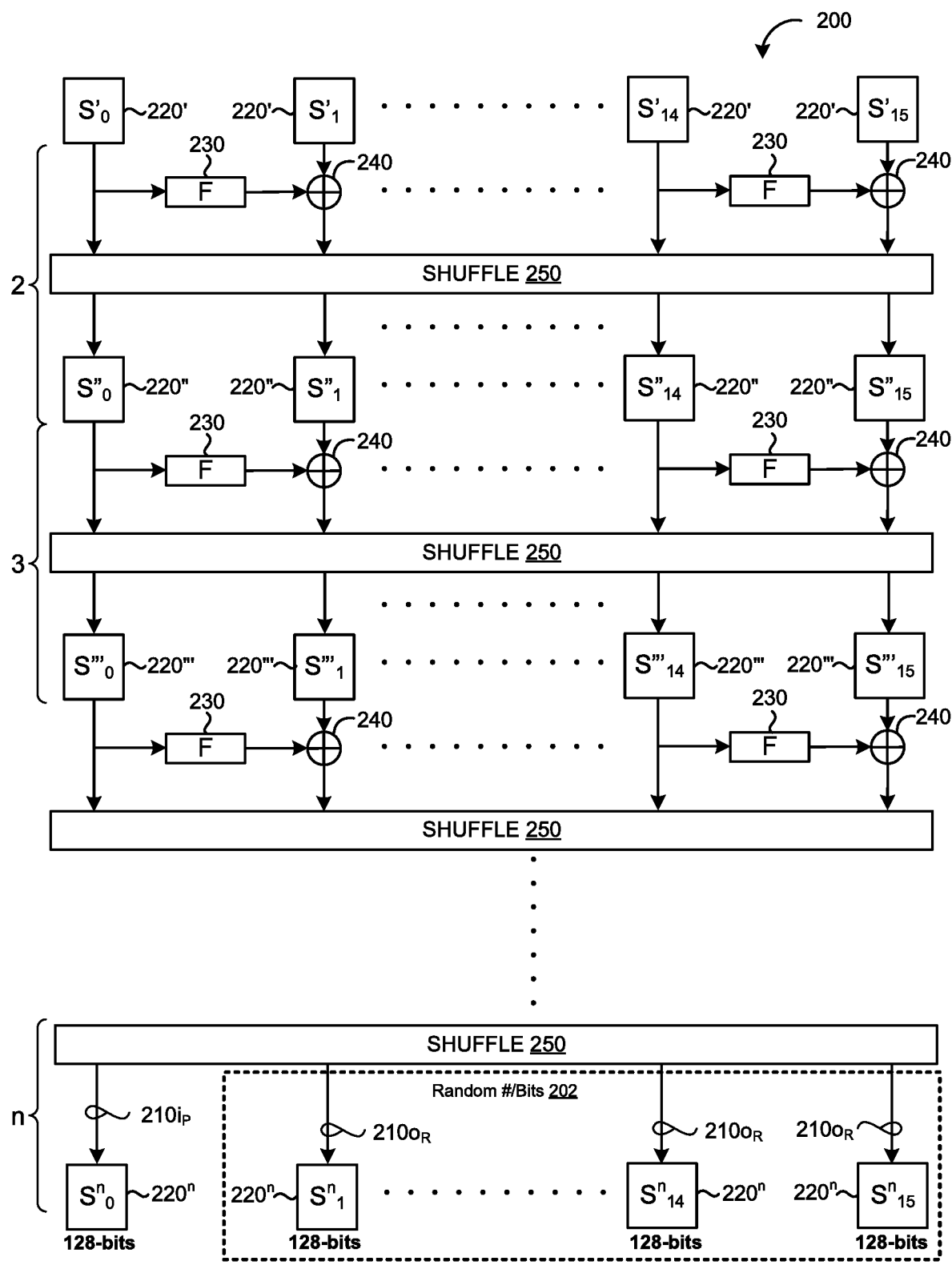

As shown in FIG. 2A, the shuffler 250 outputs the shuffled branches $S'_1, S'_2, S'_3, S'_4, \ldots, S'_{14}, S'_{15}$ 220' in the prescribed order during a first permutation round. As set forth above, the permuting may repeat the executing of the round function and subsequent shuffling for a threshold number (n) of permutation rounds (e.g., a threshold number of times) in order for the shuffling to successfully achieve full-bit diffusion. Accordingly, each permutation round occurring after the first permutation round uses the shuffled branches 220 output by the shuffler 250 during the immediately previous permutation round. For instance, FIG. 2B shows a second permutation round using the shuffled branches $S'_1, S'_2, \ldots, S'_{14}, S'_{15}$ 220' output from the first permutation round as corresponding inputs for execution of the round function and subsequent shuffling, as described above with reference to FIG. 2A. Here, the shuffler 250 outputs the shuffled branches $S''_1, S''_2, \ldots, S''_{14}, S''_{15}$ 220'' in the prescribed order during the second permutation round, whereby a third permutation round uses these shuffled branches as inputs for execution of the round function and subsequent shuffling to output the shuffled branches $S'''_1, S'''_2, \ldots, S'''_{14}, S'''_{15}$ 220''' in the prescribed order. FIG. 2B shows the permuting repeating the executing of the round function and the subsequent shuffling until reaching the threshold number (n) of permutation rounds, whereby the shuffler 250 outputs shuffled branches $S^n_1, S^n_2, \ldots, S^n_1, S^n_{15}$ 220'' in the prescribed order. Here, the branches $S^n_1, S^n_2, \ldots, S^n_1, S^n_{15}$ 220'' contain the 2,048 bits of the permutated state. In some implementations, the threshold number (n) of permutation rounds includes at least 17 permutation rounds (e.g., n=17) for achieving full-bit diffusion since the shuffling of each branch of 128 bits into the prescribed order of {7, 2, 13, 4, 11, 8, 3, 6, 15, 0, 9, 10, 1, 14, 5, 12} achieves two sub-block diffusions after 16 permutation rounds.

As set forth above, the data processing hardware 142 may retrieve the AES round keys 192 from the key source 190 at the time of permutation. The key source 190 is cryptographically secure and may generate the AES round keys 192 using any technique at the time of initializing the PRNG 200. Initializing the PRNG 200 and permuting the state of the PRNG 200 for the 17 permutation rounds may be expressed as follows.

```
void Permute ( ) {
    // Round keys for one AES per Feistel round and branch.
    const V* keys = Keys ( );
```

```
    for (int round = 0; round < 17; ++round) {
        keys = RoundFunctions (keys);
        BlockShuffle ( );
    }
}
```

With continued reference to FIG. 2B, the first branch $S''_1$ 220'' includes permutated inner bits $210i_P$ corresponding to the first 128-bits of the 2,048-bits of the permutated state and the second through sixteenth branches $S''_2$-$S''_{15}$ each include permutated random outer bits $210o_R$ corresponding to the remaining bits of the 2,048 bits of the permutated state. Here, the random outer bits $210o_R$ correspond to the random number(s)/bits 202 generated and output by the PRNG 200 for use by the software application 170 executing on the remote system 140 and/or on the client device 110.

Figure 2C:
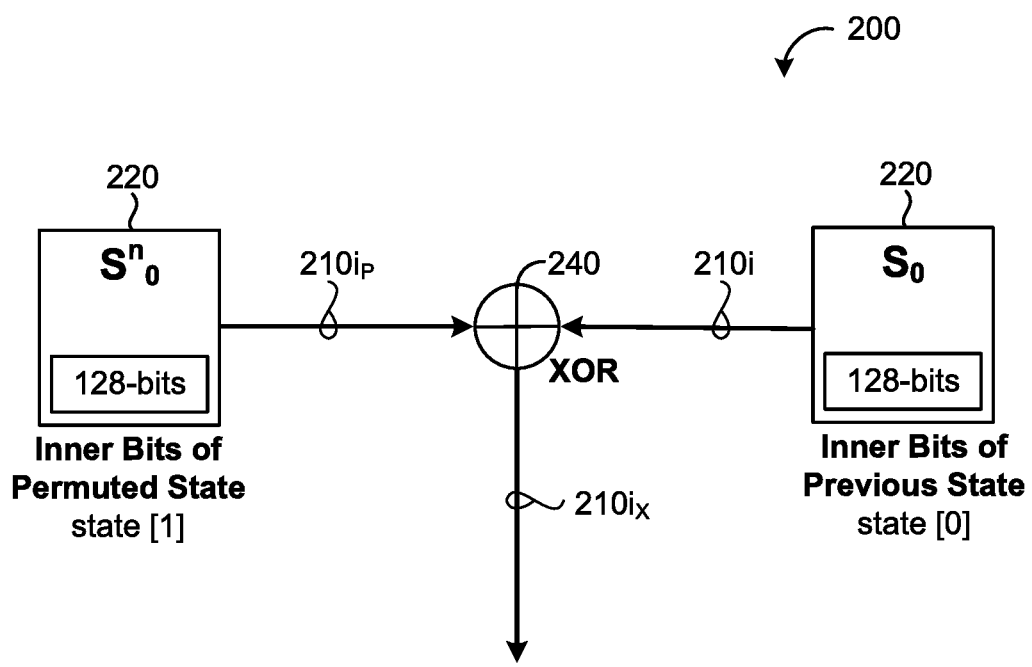
FIG. 2C is a schematic view of the PRNG of FIGS. 2A and 2B executing an XOR between inner bits of a permuted state and inner bits of a previous state.

Referring to FIG. 2C, in some implementations, the PRNG 200 (e.g., via the data processing hardware 142) executes an XOR of the permutated inner bits $210i_P$ of the permuted state (e.g., state [1]) with the inner bits $210i$ of a previous state (e.g., state [0]) to generate XOR'd inner bits $210i_X$. In the example shown, the inner bits $210i$ of the previous state include the first 128-bits of the first branch $S_0$ 220 when the PRNG 200 initialized (FIG. 2A). Here, the XOR'd inner bits $210i_X$ provide the PRNG 200 with the aforementioned 'backtracking resistance' to prevent reconstruction of past outputs even if the current state (e.g., the permutated state [1]) of the PRNG 200 is compromised. Thus, adversaries cannot expect to distinguish prior outputs from random with less than $2^{127}$ forward or backward queries to the permutation (e.g., by guessing the XOR'd inner bits $210i_X$). Accordingly, the PRNG 200 allows access to the random outer bits $210o_R$ corresponding to the random number(s)/bits 202 and prevents access to the inner bits $210i$, $210i_X$. Executing the XOR of the inner bits of the permutated state with the inner bits of the previous state may be expressed as follows.

```
void Generate ( ) {
    const uint64_t prev_inner [2] = { state [0] , state [1] };
    Permute ( );
    // Ensure backtracking resistance.
    state [0] ^= prev_inner [0];
    state [1] ^= prev_inner [1];
    // Application can now consume state [2..31].
}
```

Figure 3:
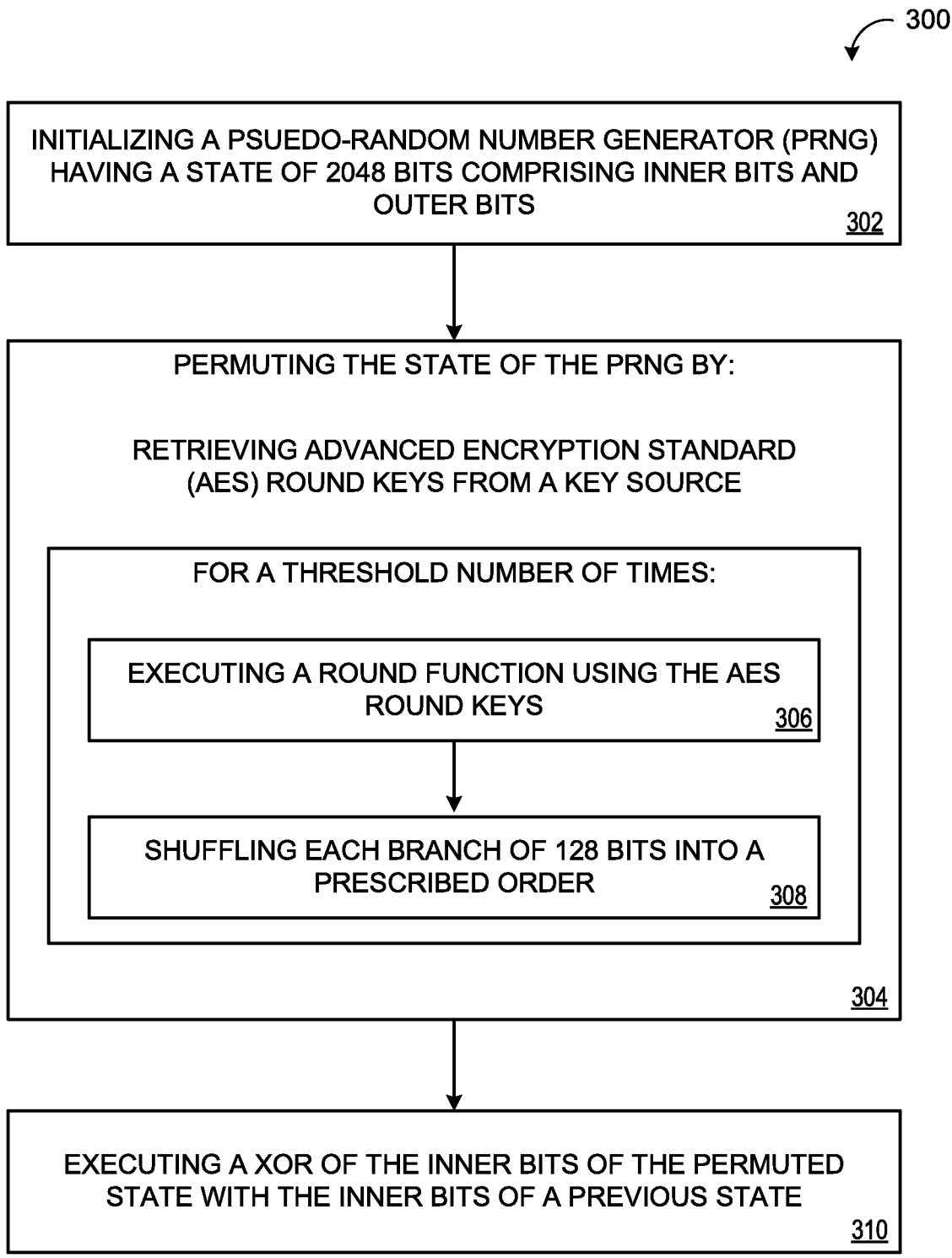
FIG. 3 is a flowchart of an example method for generating a random number.

FIG. 3 is a flowchart of an example method 300 for generating random numbers. The flowchart starts at operation 302 when data processing hardware 142 initializes a pseudo-random number generator (PRNG) having a state of 2048 bits including inner bits $210i$, 210 and outer bits $210o$, 210. The inner bits $210i$ include the first 128 bits of the 2048 bits and the outer bits $210o$ include the remaining bits of the 2048 bits. The initializing the state of the PRNG 200 may include setting the state of the PRNG 200 to zero and setting the outer bits $210o$ to arbitrary seed values. The arbitrary seed values may be user-specified. In other examples, initializing the state of the PRNG 200 includes setting the state of the PRNG 200 to a previous state.

At operation 304, the data processing hardware 142 permutes the state of the PRNG 200 by first retrieving Advanced Encryption Standard (AES) round keys 192 from a key source 190. The data processing hardware 142 may retrieve at least two different AES round keys 192 and the key source 190 may be cryptographically secure. For a threshold number of times, the data processing 142 further permutes the state of the PRNG 200 by executing a round function using the AES round keys 192 and shuffling branches 220. Specifically, at operation 306, executing the round function using the AES round keys 192 includes XOR'ing odd-numbered branches 220 of a Feistel network having 16 branches of 128 bits with a function of corresponding even-numbered neighbor branches 220 of the Feistel network. In some examples, the round function includes at least two rounds of AES. Each of the at least two rounds of AES may include a corresponding AES round key 192 that is different than the AES round keys 192 of the other rounds of AES. At operation 308, shuffling the branches 220 includes shuffling each branch 220 of 128-bits into a prescribed order. The prescribed order may be selected to achieve full sub-branch diffusion after executing the round function and shuffling each branch 220 eight times. In some examples, the prescribed order includes {7, 2, 13, 4, 11, 8, 3, 6, 15, 0, 9, 10, 1, 14, 5, 12}. In some implementations, the threshold number of times includes at least 17 times in order for the permutation to achieve full-bit diffusion. At operation 308, the data processing hardware 142 executes an XOR of the inner bits 210, $210i_P$ of the permuted state with the inner bits $210i$ of a previous state. The XOR generates XOR'd inner bits $210i_X$ to provide the PRNG 200 with 'backtracking resistance' to prevent reconstruction of past outputs even if the current state (e.g., the permutated state [1]) of the PRNG 200 is compromised.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 4:
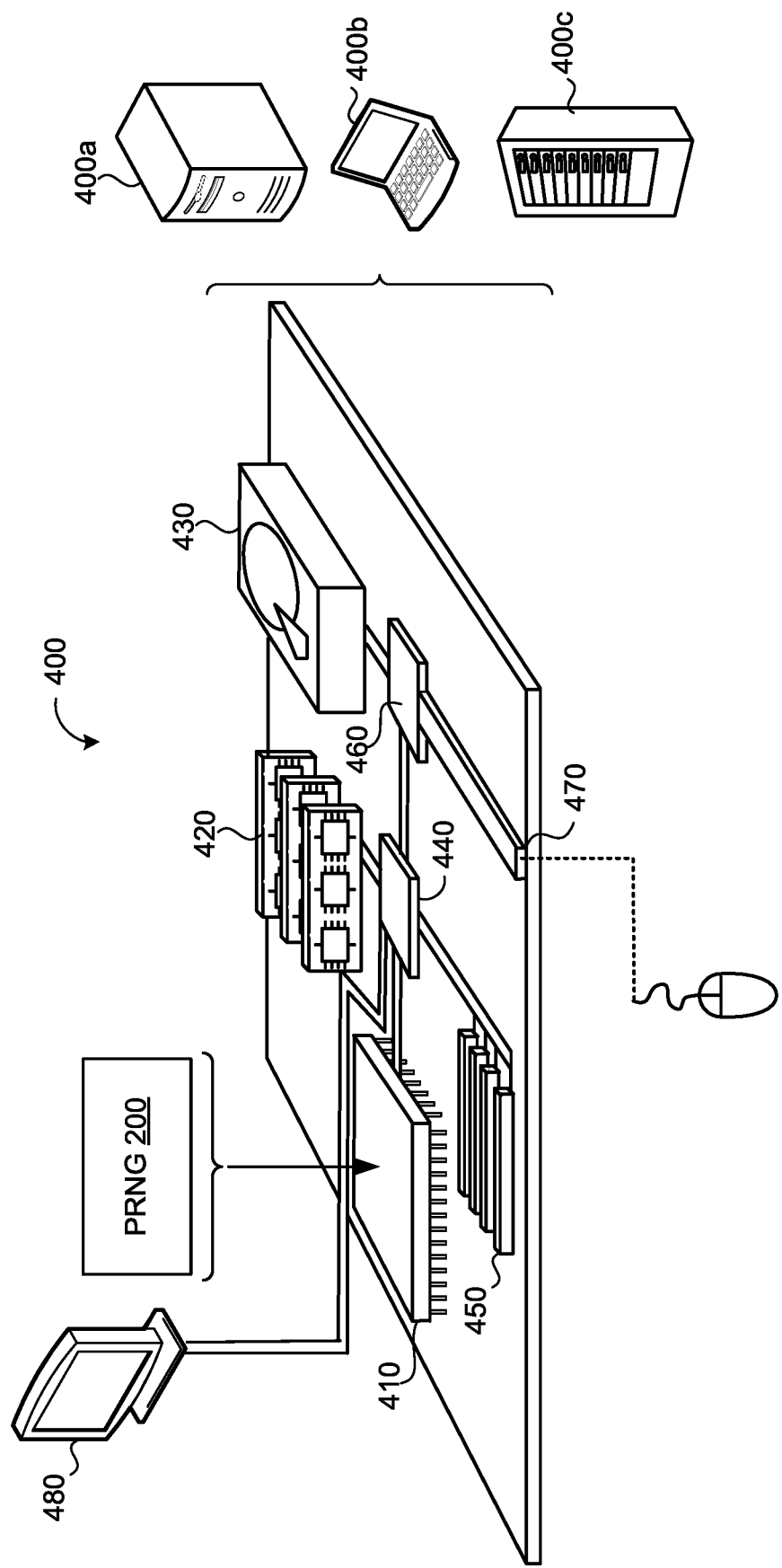
FIG. 4 is a schematic view of an example computing device.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 440, and a low speed interface/controller 460 connecting to a low speed bus 470 and a storage device 430. The PRNG 200 may reside on the computing device 400. Each of the components 410, 420, 430, 440, 450, and 460, are interconnected using various busses, and may be mounted on a common motherboard or in other manners as appropriate. The processor 410 (e.g., data processing hardware 142) can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 (e.g., memory hardware 144) stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method for generating random numbers, the method comprising:
   initializing, by data processing hardware, a pseudo-random number generator (PRNG) having a state of 2048 bits comprising inner bits and outer bits, the inner bits comprising the first 128 bits of the 2048 bits and the outer bits comprising the remaining bits of the 2048 bits;
   permuting, by the data processing hardware, the state of the PRNG by:
   retrieving Advanced Encryption Standard (AES) round keys from a key source; and
   for a threshold number of times:
   executing a round function using the AES round keys, the round function comprising XOR'ing odd-numbered branches of a Feistel network having 16 branches of 128 bits with a function of corresponding even-numbered neighbor branches of the Feistel network; and
   shuffling each branch of 128 bits into a prescribed order; and
   executing, by the data processing hardware, an XOR of the inner bits of the permuted state with the inner bits of a previous state.

2. The method of claim 1, wherein initializing the PRNG comprises:
   setting the state of the PRNG to zero; and
   setting the outer bits to arbitrary seed values.

3. The method of claim 1, wherein initializing the PRNG comprises setting the state of the PRNG to a previous state.

4. The method of claim 1, wherein the threshold number of times comprises at least 17 times.

5. The method of claim 1, wherein the round function comprises at least two rounds of AES.

6. The method of claim 1, wherein each of the at least two rounds of AES uses a corresponding AES round key that is different than the AES round keys of the other rounds of AES.

7. The method of claim 1, wherein XOR'ing the odd-numbered branches of the Feistel network with the function of corresponding even-numbered neighbor branches of the Feistel network results in random bits, the outer bits comprising the resulting random bits.

8. The method of claim 1, wherein shuffling each branch of 128 bits into the prescribed order achieves full sub-branch diffusion after executing the round function and shuffling each branch eight times.

9. The method of claim 1, wherein the prescribed order comprises {7, 2, 13, 4, 11, 8, 3, 6, 15, 0, 9, 10, 1, 14, 5, 12}.

10. The method of claim 1, further comprising preventing access to the inner bits and allowing access to the outer bits.

11. A system comprising:
data processing hardware; and
memory hardware in communication with the data processing hardware, the memory hardware storing instructions that when executed on the data processing hardware cause the data processing hardware to perform operations comprising:
initializing a pseudo-random number generator (PRNG) having a state of 2048 bits comprising inner bits and outer bits, the inner bits comprising the first 128 bits of the 2048 bits and the outer bits comprising the remaining bits of the 2048 bits;
permuting the state of the PRNG by:
retrieving Advanced Encryption Standard (AES) round keys from a key source; and
for a threshold number of times:
executing a round function using the AES round keys, the round function comprising XOR'ing odd-numbered branches of a Feistel network having 16 branches of 128 bits with a function of corresponding even-numbered neighbor branches of the Feistel network; and
shuffling each branch of 128 bits into a prescribed order; and
executing an XOR of the inner bits of the permuted state with the inner bits of a previous state.

12. The system of claim 11, wherein initializing the PRNG comprises:
setting the state of the PRNG to zero; and
setting the outer bits to arbitrary seed values.

13. The system of claim 11, wherein initializing the PRNG comprises setting the state of the PRNG to a previous state.

14. The system of claim 11, wherein the threshold number of times comprises at least 17 times.

15. The system of claim 11, wherein the round function comprises at least two rounds of AES.

16. The system of claim 11, wherein each of the at least two rounds of AES uses a corresponding AES round key that is different than the AES round keys of the other rounds of AES.

17. The system of claim 11, wherein XOR'ing the odd-numbered branches of the Feistel network with the function of corresponding even-numbered neighbor branches of the Feistel network results in random bits, the outer bits comprising the resulting random bits.

18. The system of claim 11, wherein shuffling each branch of 128 bits into the prescribed order achieves full sub-branch diffusion after executing the round function and shuffling each branch eight times.

19. The system of claim 11, wherein the prescribed order comprises {7, 2, 13, 4, 11, 8, 3, 6, 15, 0, 9, 10, 1, 14, 5, 12}.

20. The system of claim 11, wherein the operations further comprise preventing access to the inner bits and allowing access to the outer bits.

* * * * *